United States Patent
Ishitsuka et al.

(10) Patent No.: US 9,766,106 B2
(45) Date of Patent: Sep. 19, 2017

(54) THERMAL AIR FLOW SENSOR

(75) Inventors: Norio Ishitsuka, Tokyo (JP); Keiji Hanzawa, Hitachinaka (JP); Yasuo Onose, Hitachinaka (JP); Noriyuki Sakuma, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 369 days.

(21) Appl. No.: 14/355,104

(22) PCT Filed: Nov. 28, 2011

(86) PCT No.: PCT/JP2011/006592
§ 371 (c)(1),
(2), (4) Date: Apr. 29, 2014

(87) PCT Pub. No.: WO2013/080239
PCT Pub. Date: Jun. 6, 2013

(65) Prior Publication Data
US 2014/0284753 A1    Sep. 25, 2014

(51) Int. Cl.
*G01F 1/692* (2006.01)
*G01F 1/69* (2006.01)

(52) U.S. Cl.
CPC ............. *G01F 1/69* (2013.01); *G01F 1/692* (2013.01)

(58) Field of Classification Search
CPC .................................. G01F 1/69; G01F 1/692
USPC ....................................... 257/467; 73/204.26
See application file for complete search history.

(56) References Cited

U.S. PATENT DOCUMENTS

| | | | | |
|---|---|---|---|---|
| 6,240,777 B1 * | 6/2001 | Treutler et al. | ....... | G01F 1/6845 73/204.11 |
| 6,523,403 B1 * | 2/2003 | Fuertsch et al. | ........ | G01F 1/692 73/204.26 |
| 6,923,053 B2 * | 8/2005 | Yamada | ................ | G01F 1/6845 73/204.26 |

(Continued)

FOREIGN PATENT DOCUMENTS

| | | |
|---|---|---|
| JP | 11-287687 A | 10/1999 |
| JP | 2010-112757 A | 5/2010 |
| JP | 2010-133897 A | 6/2010 |

OTHER PUBLICATIONS

International Search Report with English translation dated Mar. 6, 2012 (3 pages).

*Primary Examiner* — Marcos D. Pizarro
(74) *Attorney, Agent, or Firm* — Crowell & Moring LLP

(57) ABSTRACT

A thermal air flow sensor that produces less measurement error is provided. The thermal air flow sensor includes: a semiconductor substrate; a heating resistor, resistance temperature detectors, and an electrical insulator that includes a silicon oxide film, wherein the heating resistor, the resistance temperature detectors, and the electrical insulator are formed on the semiconductor substrate; and a diaphragm portion formed by removing a portion of the semiconductor substrate. The heating resistor and the resistance temperature detectors are formed on the diaphragm portion. The thermal air flow sensor further includes a silicon nitride film formed as the electrical insulator above the heating resistor and the resistance temperature detectors. The silicon nitride film has steps conforming to the patterns of the heating resistor and the resistance temperature detectors. The silicon nitride film has a multilayer structure.

4 Claims, 4 Drawing Sheets

(56) References Cited

U.S. PATENT DOCUMENTS

| | | | | |
|---|---|---|---|---|
| 7,673,508 B2* | 3/2010 | Sakuma | ............... | G01F 1/6845 |
| | | | | 73/204.26 |
| 2013/0269428 A1* | 10/2013 | Baur et al. | ............. | G01F 1/684 |
| | | | | 73/204.26 |

* cited by examiner

[FIG. 1]
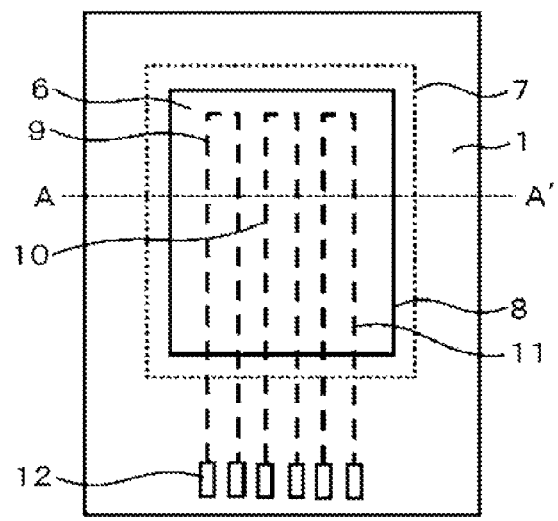
[FIG. 2]
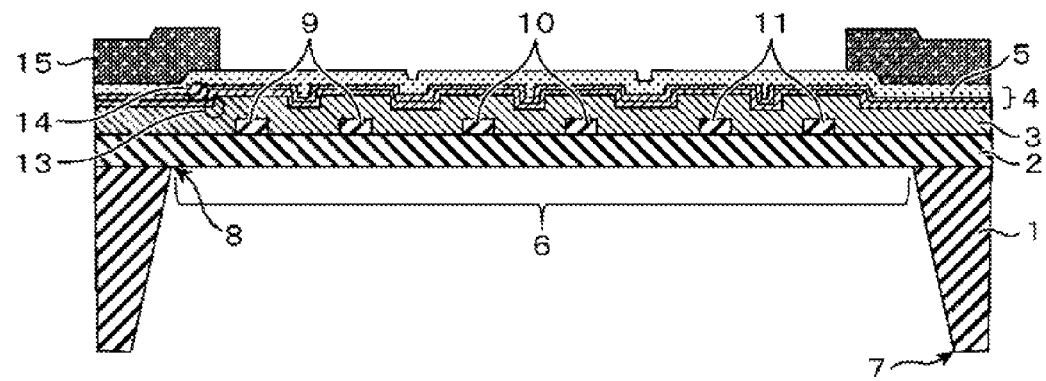
[FIG. 3]
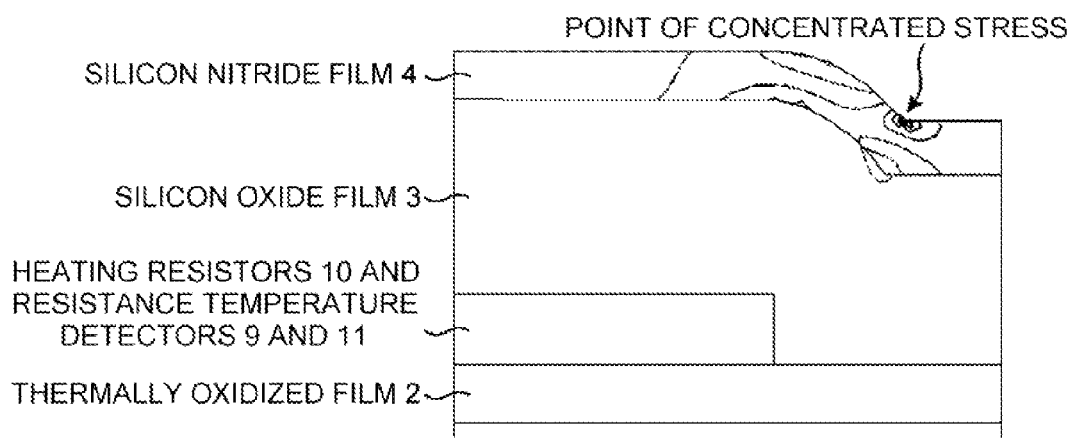

[FIG. 4]
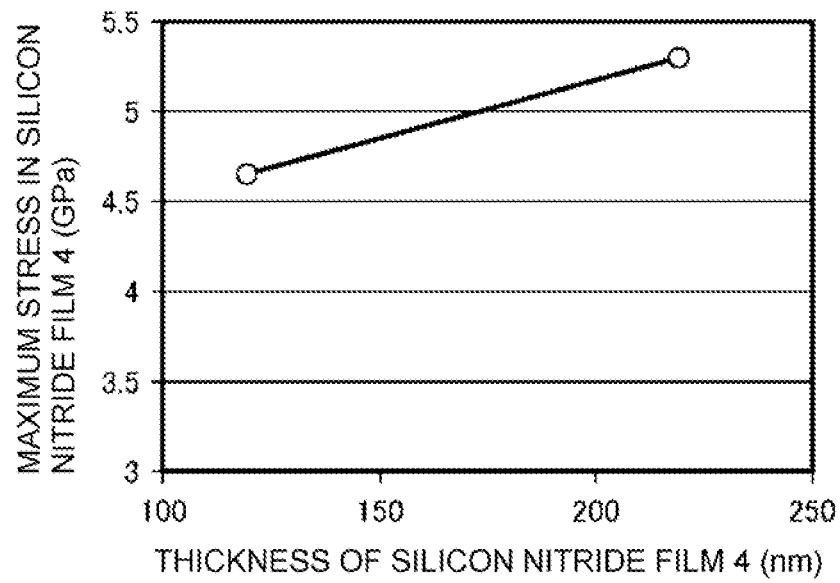
[FIG. 5]
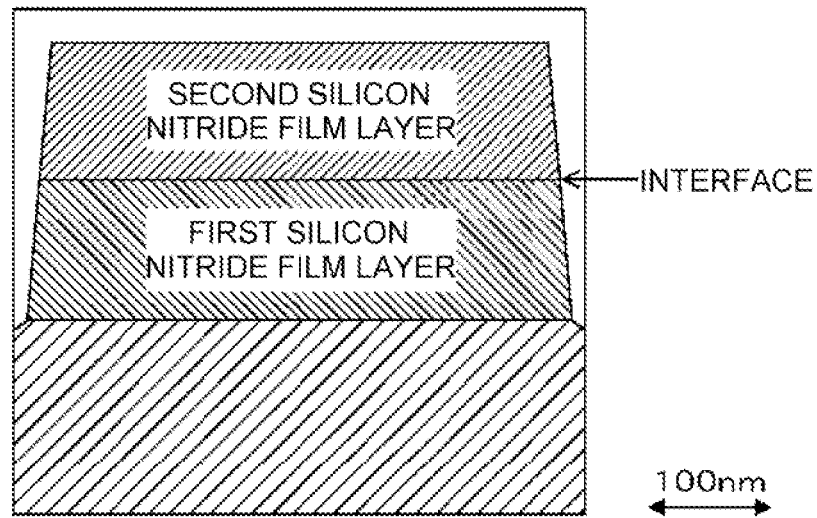

[FIG. 6]
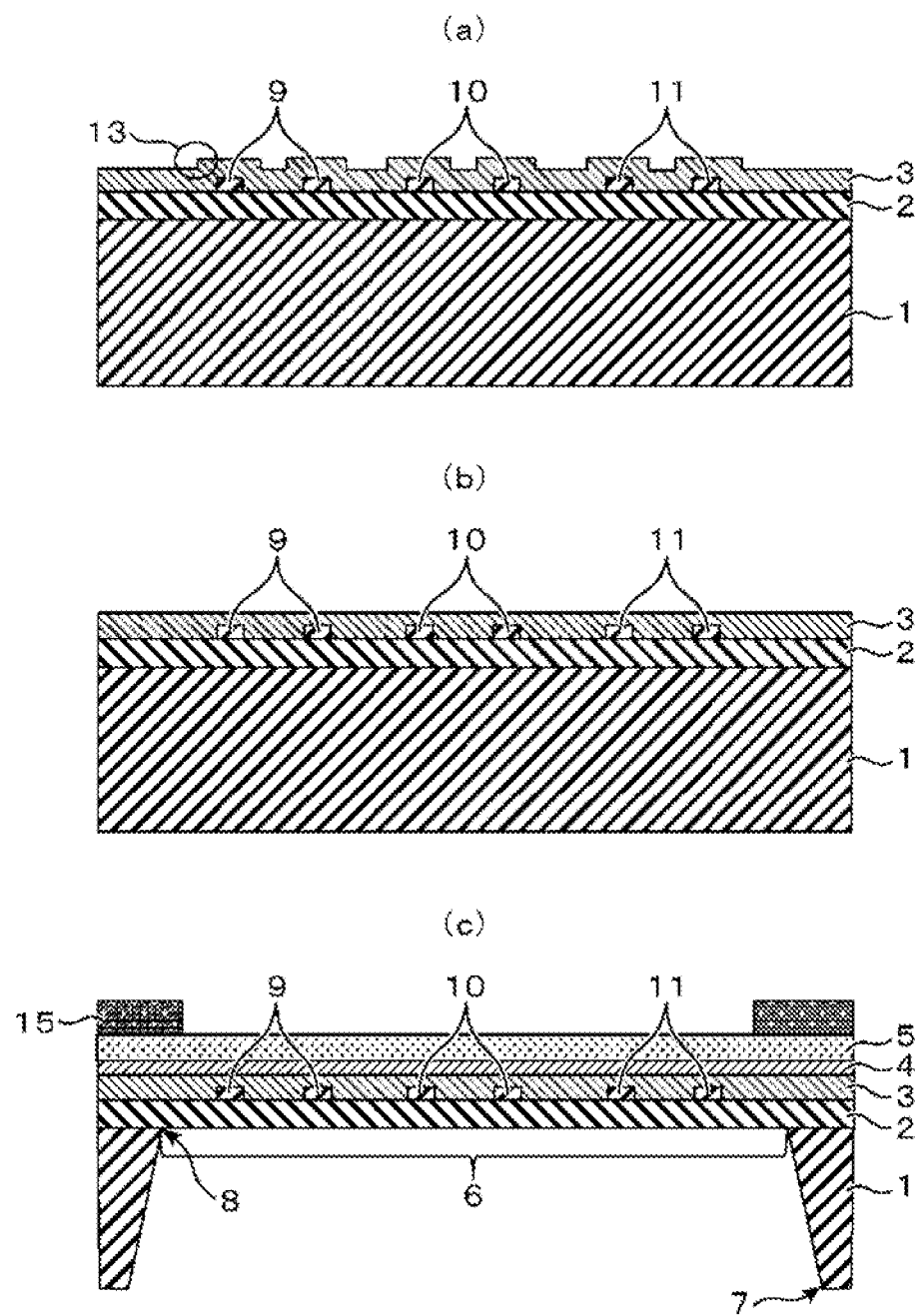

[FIG. 7]
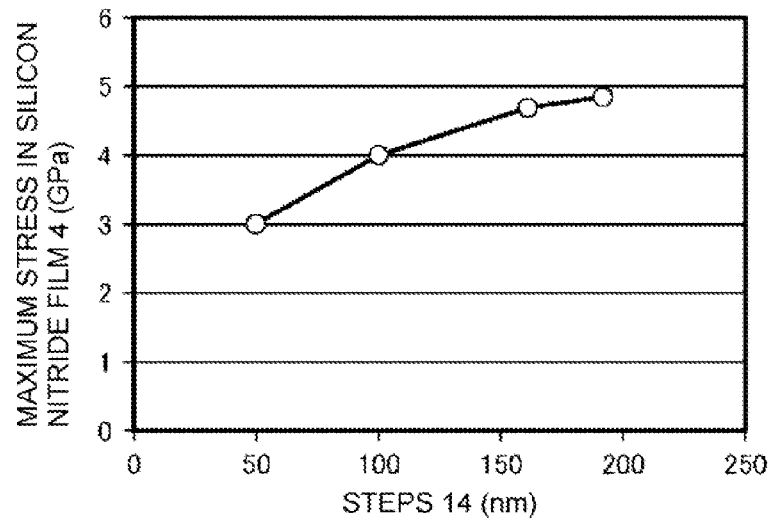
[FIG. 8]
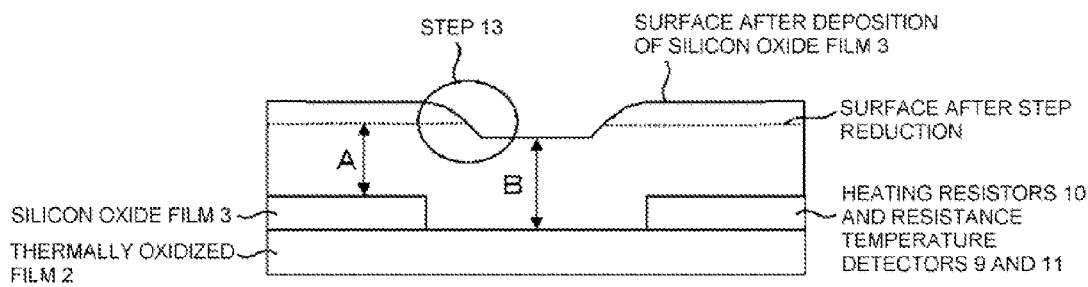
[FIG. 9]
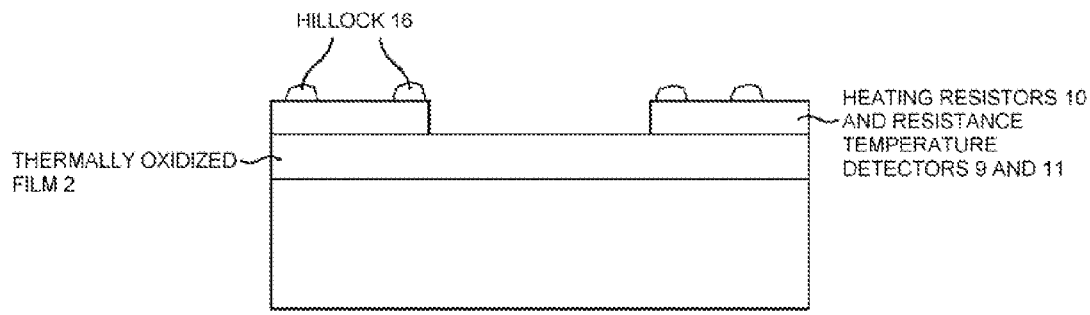

THERMAL AIR FLOW SENSOR

TECHNICAL FIELD

The present invention relates to a thermal air flow sensor, a measurement device used for air flow meters, that measures air flow with a heating resistor and a resistance temperature detector.

BACKGROUND ART

The thermal air flow meter that can directly detect air volume has become the mainstream air flow meter. In particular, a thermal air flow meter provided with a measurement device produced by semiconductor micromachining has attracted interest as a low-cost, low-power-consumption air flow meter. For example, PTL 1 proposes a measurement device (thermal air flow sensor) for use in such thermal air flow meters. The thermal air flow sensor proposed by this publication includes an electrically insulating film formed on a semiconductor substrate, heating resistors and resistance temperature detectors formed on the electrically insulating film, and an electrical insulator formed on the heating resistors and the resistance temperature detectors. The heating resistor and resistance temperature detector region has a diaphragm structure formed by removing a portion of the semiconductor substrate from the back side by anisotropic etching.

CITATION LIST

Patent Document

PTL 1: JP-A-2010-133897

SUMMARY OF INVENTION

Technical Problem

In the thermal air flow sensor proposed by PTL 1, the heating resistor and resistance temperature detector region has a diaphragm structure, and a silicon oxide film, a silicon nitride film, and a silicon oxide film are laminated on the surfaces of these resistors by using a plasma CVD (chemical vapor deposition) method. Films formed by CVD are typically coarse (low atom density), and are subjected to a high-temperature (1,000° C.) heat treatment to densify the films. The silicon nitride film generates a particularly high stress during this heat treatment.

The heating resistor and the resistance temperature detector are formed by deposition and patterning of a metal film such as a molybdenum film, and the surfaces of the silicon oxide film and the silicon nitride film deposited on these surfaces have steps conforming to the thickness of the metal film. The high stress in the silicon nitride film concentrates in these step portions, and may cause cracking in the film. The cracks allow entry of oxygen and moisture from the surface, and cause the resistors to oxidize. The oxidation varies the resistance of the resistors as it progresses, and produces measurement errors in the air flow meter.

It is an object of the invention to provide a thermal air flow sensor that produces less measurement error.

Solution to Problem

In order to achieve the foregoing object, a thermal air flow sensor of the invention includes a semiconductor substrate; a heating resistor, resistance temperature detectors, and an electrical insulator that includes a silicon oxide film, wherein the heating resistor, the resistance temperature detectors, and the electrical insulator are formed on the semiconductor substrate; and a diaphragm portion formed by removing a portion of the semiconductor substrate, the heating resistor and the resistance temperature detectors being formed on the diaphragm portion, and the thermal air flow sensor further comprising a silicon nitride film formed as the electrical insulator above the heating resistor and the resistance temperature detectors, wherein the silicon nitride film has steps conforming to the patterns of the heating resistor and the resistance temperature detectors, and wherein the silicon nitride film has a multilayer structure.

Advantage Effects of Invention

With the invention, a thermal air flow sensor can be provided that produces less measurement error.

BRIEF DESCRIPTION OF DRAWINGS

FIG. 1 is a schematic plan view of a measurement device of First Embodiment of the present application.

FIG. 2 is a cross sectional view of First Embodiment according to the present application.

FIG. 3 is a diagram representing a distribution of the generated stress in a silicon nitride film.

FIG. 4 is a diagram showing that the generated stress in a silicon nitride film is dependent on silicon nitride film thickness.

FIG. 5 is a photographic representation of interface formation after the deposition of a second silicon nitride film on a first silicon nitride film.

FIG. 6 is a cross sectional view of Second Embodiment of the present application.

FIG. 7 is a diagram representing the dependence of steps on the generated stress in a silicon nitride film.

FIG. 8 is a diagram representing how the steps of a silicon oxide film are reduced by mechanical polishing and etch back.

FIG. 9 is a diagram representing hillock formation on heating resistors and resistance temperature detectors.

DESCRIPTION OF EMBODIMENTS

Embodiments of the invention are described below.

Embodiment 1

A thermal air flow sensor as First Embodiment of the invention is described below with reference to FIGS. 1 and 2. FIG. 1 is a schematic plan view of the thermal air flow sensor. FIG. 2 is a cross sectional view taken at A-A' of FIG. 1.

As illustrated in FIG. 1, the thermal air flow sensor (a measurement device used for a thermal air flow meter) of the present embodiment is configured to include a silicon substrate 1, heating resistors 10, resistance temperature detectors 9 and 11 for measuring air temperature, terminal electrodes 12, and a diaphragm portion 6. The diaphragm portion 6 has an end portion 8.

A producing method of the present embodiment is described below with reference to FIG. 2.

The silicon substrate 1 is thermally oxidized to form a thermally oxidized film 2 that becomes a lower electrically insulating film. A molybdenum (Mo) film is then deposited on the thermally oxidized film 2 in a thickness of about 150 nm, and the heating resistors 10 and the resistance temperature detectors 9 and 11 are formed by patterning. The lower electrically insulating film may be formed solely by the thermally oxidized film 2, or may be formed as a laminate with a silicon nitride (SiN) film or a silicon oxide film (SiO$_2$). The structure heating resistors 10, and the resistance temperature detectors 9 and 11 may be formed by using a metal film, such as platinum, instead of using the molybdenum film. Thereafter, a silicon oxide film 3 (upper electrically insulating film) is deposited on the heating resistors 10 and the resistance temperature detectors 9 and 11 in a thickness of about 500 nm by using a plasma CVD method. This is followed by a heat treatment at a temperature of 800° C. or more to densify the film. The heat treatment forms steps 13 corresponding to the thickness of the deposited molybdenum. A silicon nitride film 4 is then formed in a thickness of about 200 nm by a two-step deposition procedure. Here, a heat treatment is always performed after each deposition, specifically after the first deposition and the second deposition of the silicon nitride film. The heat treatments are performed at 800° C. or more, a temperature that allows the silicon nitride film to be densified. Because the silicon nitride film 4 is deposited on the steps 13 of the silicon oxide film 3, the silicon nitride film 4 formed has steps 14. Thereafter, a silicon oxide film 5 is deposited in a thickness of 300 to 500 nm by using a plasma CVD method, and a heat treatment is performed at 800° C. or more. This is followed by deposition and patterning of a polyimide-based resin film to form a PIQ film 15. Referring to FIG. 1, the terminal electrodes 12 are formed by depositing aluminum, gold, or the like through contact holes formed through the upper electrically insulating film after forming the silicon oxide film 5 (not illustrated). Finally, the diaphragm portion 6 is formed from the back surface, using a silicon oxide film or the like as masking material, and an etchant such as KOH (not illustrated). The diaphragm portion 6 may be formed by using a dry etching method. Referring to FIG. 2, the etching mask (masking material) has an end portion 7. The masking material covers the area outside the etching mask end portion 7, and etching removes the silicon substrate material in the region of the diaphragm portion 6.

In the present embodiment, the upper electrically insulating film has a three-layer structure configured from the silicon oxide film 3, the silicon nitride film 4, and the silicon oxide film 5. However, the upper electrically insulating film may be configured from more than three layers.

Advantages of the present embodiment are described below.

The present inventors conducted studies to find the cause of the cracking the occurs when the silicon nitride film 4 is formed as a monolayer film, and found that cracks are caused by a high tensile stress, as high as 1,000 MPa, that generates inside the film, and concentrates on the surfaces of the steps 14 as a result of the silicon nitride film 4 being densified by the high-temperature heat treatment performed after the deposition of the silicon nitride film 4.

In the thermal air flow sensor, the heating resistors 10 generate heat of about 200 to 300° C. at all times, and the sensitivity of the air flow sensor increases as the heating temperature increases. The heat of the heating resistors 10 heats the thermally oxidized film 2, the silicon oxide film 3, the silicon nitride film 4, and the silicon oxide film 5 disposed in the vicinity. The film stress of these films varies with the temperature of heat treatment. Thus, absent a high-temperature heat treatment, the heat of the heating resistors 10 varies the film stress, and deforms the diaphragm. This causes air flow detection errors as the resistance values of the heating resistors 10 and the resistance temperature detectors 9 and 11 vary because of the piezoresistive effect. In the present embodiment, this is prevented by the heat treatment of 800° C. or more, which is always performed after the deposition of the upper and lower electrically insulating films.

In common LSIs, aluminum is used for the wiring material, and electrically insulating films such as a silicon oxide film and a silicon nitride film are formed after the deposition of the aluminum film. Because the melting point of aluminum is about 550° C., the deposition of the silicon oxide film and the silicon nitride film on the aluminum is not followed by high-temperature annealing of 500° C. or more, and the silicon nitride film does not generate high tensile stress. Further, the heat-induced film stress changes hardly occur because of the low heat generation, at most 125° C., of the LSI. Further, because the LSI does not have a diaphragm structure, there is hardly any substrate bending due to film stress changes, and the electrical properties of the LSI remain unaffected. The cracking problem of the silicon nitride film 4 is indeed specific to thermal air flow sensors.

FIG. 3 represents the result of the analysis of the generated stress in the silicon nitride film 4. It can be seen that the stress is concentrated in the surface of the silicon nitride film 4. FIG. 4 shows that the stress is dependent on the thickness of the silicon nitride film 4. The stress decreases with decrease in thickness. It is tempting to think from this result that the stress can be effectively reduced by making the silicon nitride film 4 thinner. However, reducing the thickness of the silicon nitride film 4 lowers the diaphragm strength against dust collisions, and it is not desirable to reduce the thickness of the silicon nitride film 4.

The stress concentrated in surface portions of the silicon nitride film 4, as shown in FIG. 3. The cause of the generated stress in the silicon nitride film 4 was the film contraction due to heat treatment. Less stress generated when the silicon nitride film 4 was made thinner. Reducing the film thickness lowers stress because the thinner thickness involves less film contraction. It is therefore considered possible to lower the surface stress by providing the silicon nitride film 4 as a multilayer film, and reducing the film thickness of the last layer. Specifically, a heat treatment is performed after the deposition of the first layer to contract the film, and a heat treatment is also performed after the second deposition. In this way, the surface stress generated in the silicon nitride film 4 only comes from the contraction of the second layer film, and the generated stress can be reduced without varying the film thickness.

This method involves interface formation between the first layer and the second layer, as shown in FIG. 5. As to the thickness ratio of the first and second layers in the two-layer structure, the effect remains even when the second layer is thicker than the first layer, because the second layer will still be thinner than the total thickness. However, the stress can be reduced more effectively when the second layer is thinner than the first layer.

The silicon nitride film 4, described as having a two-layer structure in the foregoing First Embodiment, may have a three- or four-layer structure.

In any case, the surface stress generated in the silicon nitride film 4 can be effectively reduced when the films in the multilayer structure have the same thickness, or when the film formed last is the thinnest of the other films in the multilayer structure.

Embodiment 2

Second Embodiment differs from First Embodiment only in the producing method, and will be described with respect to the producing method, with reference to FIG. 6(a) to (c).

As shown in FIG. 6(a), the silicon substrate 1 is thermally oxidized to form a thermally oxidized film 2 that becomes a lower electrically insulating film. A molybdenum (Mo) film is then deposited on the thermally oxidized film 2 in a thickness of 150 nm, and the heating resistors 10 and the resistance temperature detectors 9 and 11 are formed by patterning. The lower electrically insulating film may be formed solely by the thermally oxidized film 2, or may be formed as a laminate with a silicon nitride (SiN) film or a silicon oxide film ($SiO_2$). The heating resistors 10, and the resistance temperature detectors 9 and 11 may be formed by using a metal film, such as platinum, instead of using the molybdenum film. Thereafter, a silicon oxide film 3 (upper electrically insulating film) is deposited on the heating resistors 10 and the resistance temperature detectors 9 and 11 in a thickness of about 600 nm to 700 nm by using a plasma CVD method. This is followed by a heat treatment at a temperature of 800° C. or more to densify the film. The heat treatment forms steps 13 corresponding to the thickness. The steps 14 are then planarized by mechanical polishing (CMP) to make the thickness of the silicon oxide film 3 about 500 nm, as shown in FIG. 6(b). As used herein, "planarize" means eliminating steps that conform to the patterns of the heating resistors 10 and the resistance temperature detectors 9 and 11. A silicon nitride film 4 is then deposited in a thickness of about 200 nm, and a heat treatment is performed at 800° C. or more to densify the silicon nitride film 4, as shown in FIG. 6(c). Thereafter, a silicon oxide film 5 is deposited in a thickness of 300 to 500 nm by using a plasma CVD method, and a heat treatment is performed at 800° C. or more. The terminal electrodes 12, and the diaphragm portion 6 are then formed in the same manner as in Embodiment 1.

Advantages of the present embodiment are described below.

The cause of the cracking that occurs in the silicon nitride film 4 is the high film stress, and the stress concentration due to the step formation. In Embodiment 1, this is counteracted by reducing the film stress. In Embodiment 2, the steps 14 are removed by mechanical polishing to suppress stress concentration and the stress-induced crack generation.

The common planarization procedures used in LSI wiring layer formation is intended to eliminate the contact failure of the contact wires connecting the lower layer wiring and the upper layer wiring. This is in contrast to the present embodiment in which the planarization prevents the crack generation in the electrically insulating film. That is, the purpose of the planarization is different.

The stress can be reduced by reducing the steps as shown in FIG. 7, instead of completely planarizing the silicon oxide film 3 in the manner as shown in FIG. 6(b). Because the steps can be reduced by using mechanical polishing or etch back, the generated stress can be reduced to suppress crack generation. Needless to say, the amount of etching is less than the thickness of the heating resistors 10 and the resistance temperature detectors 9 and 11. Further, as shown in FIG. 8, the thickness of the silicon oxide film 3 after the mechanical polishing satisfies the relation B>A, where A is the thickness of the region where the heating resistors 10 and the resistance temperature detectors 9 and 11 are deposited, and B is the thickness of the region where these members are not deposited. The steps 14 conforming to the patterns of the heating resistors 10 and the resistance temperature detectors 9 and 11 are retained.

The step reduction may be accompanied by the multilayer structure of the silicon nitride 4 described in Embodiment 1. In this way, the stress can be reduced further, and cracks can be effectively suppressed.

High-temperature annealing of the heating resistors 10 and the resistance temperature detectors 9 and 11 with metallic materials may produce hillocks 16 (local protuberances), as shown in FIG. 9. Such hillocks 16 add to the steps 13, and increase the stress. The methods described in Embodiments 1 and 2 are thus particularly effective against such hillocks 16.

REFERENCE SIGNS LIST

1 Silicon substrate
2 Thermally oxidized film
3, 5 Silicon oxide film
4 Silicon nitride film
6 Diaphragm portion
7 End portion of etching mask
8 End portion of diaphragm portion
9, 11 Resistance temperature detectors
10 Heating resistors
12 Terminal electrodes
13, 14 Steps
15 PIQ film
16 Hillocks

The invention claimed is:

1. A thermal air flow sensor comprising:
a semiconductor substrate;
a heating resistor, resistance temperature detectors, and an electrical insulator that includes a silicon oxide film, wherein the heating resistor, the resistance temperature detectors, and the electrical insulator are formed on the semiconductor substrate; and
a diaphragm portion formed by removing a portion of the semiconductor substrate,
the heating resistor and the resistance temperature detectors being formed on the diaphragm portion,
the silicon oxide film of the electrical insulator being disposed on the heating resistor and the resistance temperature detectors, and
the thermal air flow sensor further comprising a silicon nitride film laminated on the silicon oxide film,
wherein the surface of the silicon oxide film includes steps conforming to patterns of the heating resistor and the resistance temperature detectors, and
wherein the silicon nitride film has a multilayer structure.

2. A thermal air flow sensor comprising:
a semiconductor substrate;
a heating resistor, resistance temperature detectors, and an electrical insulator that includes a silicon oxide film, wherein the heating resistor, the resistance temperature detectors, and the electrical insulator are formed on the semiconductor substrate; and
a diaphragm portion formed by removing a portion of the semiconductor substrate,
the heating resistor and the resistance temperature detectors being formed on the diaphragm portion, and
the thermal air flow sensor further comprising a silicon nitride film formed as the electrical insulator above the heating resistor and the resistance temperature detectors, wherein the silicon nitride film has steps conforming to patterns of the heating resistor and the resistance temperature detectors, and wherein the silicon nitride film has a multilayer structure.

3. The thermal air flow sensor according to claim 2, wherein the silicon nitride film has a bilayer structure including a first layer and a second layer, the second layer being thinner than the first layer.

4. The thermal air flow sensor according to claim 2, wherein the film at the uppermost position of the multilayer structure is thinner than the other films of the multilayer structure.

* * * * *